US009309924B2

(12) United States Patent
Corts

(10) Patent No.: US 9,309,924 B2
(45) Date of Patent: *Apr. 12, 2016

(54) SEGMENTED COMPOSITE BEARINGS AND WIND GENERATOR UTILIZING HYDRAULIC PUMP/MOTOR COMBINATION

(71) Applicant: Jochen Corts, Remscheid (DE)

(72) Inventor: Jochen Corts, Remscheid (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/538,508

(22) Filed: Nov. 11, 2014

(65) Prior Publication Data

US 2015/0159693 A1    Jun. 11, 2015

Related U.S. Application Data

(63) Continuation of application No. 13/139,998, filed as application No. PCT/IB2009/007949 on Dec. 14, 2009, now Pat. No. 8,882,355.

(60) Provisional application No. 61/122,567, filed on Dec. 15, 2008, provisional application No. 61/139,472, filed on Dec. 19, 2008.

(51) Int. Cl.
| F16C 17/04 | (2006.01) |
| F16C 32/06 | (2006.01) |
| F16C 27/08 | (2006.01) |
| F16C 33/02 | (2006.01) |
| F16C 33/20 | (2006.01) |
| F16C 17/00 | (2006.01) |
| F16C 33/04 | (2006.01) |
| F03D 9/00 | (2006.01) |
| F16C 17/06 | (2006.01) |
| F16C 33/26 | (2006.01) |

(52) U.S. Cl.
CPC .............. *F16C 33/046* (2013.01); *F03D 9/001* (2013.01); *F16C 17/04* (2013.01); *F16C 17/06* (2013.01); *F16C 27/08* (2013.01); *F16C 33/201* (2013.01); *F16C 33/26* (2013.01); *F05B 2260/406* (2013.01); *F16C 2300/14* (2013.01); *Y02E 10/722* (2013.01)

(58) Field of Classification Search
CPC ...... F16C 17/06; F16C 33/26; F16C 2300/14; F16C 27/08; F16C 2360/31
USPC ........... 384/95, 114, 117–119, 121–123, 192, 384/202, 215, 220, 223, 224, 247, 248, 252, 384/261, 282, 284, 285, 297, 300, 303, 306, 384/308, 309, 312
See application file for complete search history.

(56) References Cited

U.S. PATENT DOCUMENTS

| 5,817,397 | A  | * | 10/1998 | Kamiya et al. ................. 428/141 |
| 6,814,493 | B2 | * | 11/2004 | Wobben .......................... 384/420 |
| 7,063,465 | B1 | * | 6/2006  | Wilkes et al. .................. 384/308 |
| 8,882,355 | B2 | * | 11/2014 | Corts ............................. 384/303 |
| 2015/0043849 | A1 | * | 2/2015 | Peterson et al. ............... 384/420 |

FOREIGN PATENT DOCUMENTS

| DE | 19805765 A1 * | 8/1998 |
| WO | WO 9410468 A1 * | 5/1994 |
| WO | WO 9501903 A1 * | 1/1995 |

* cited by examiner

*Primary Examiner* — Adam D Rogers
(74) *Attorney, Agent, or Firm* — Briggs and Morgan, P.A.

(57) ABSTRACT

A bearing assembly and wind generator. The bearing assembly includes a plurality of bearing segments defining a sliding member and a bearing body, with the sliding member and bearing body being joined together, and the plurality of bearing segments being coupled together to define an annular bearing structure. Also, a wind generator includes a wind rotor supported upon a tower, a hydraulic pump coupled to the wind rotor, and with rotation of the hydraulic pump pressurizing a hydraulic fluid, and a hydraulic motor in fluid communication with the hydraulic pump, and an electrical generator driven by the hydraulic motor to produce electrical energy.

20 Claims, 13 Drawing Sheets

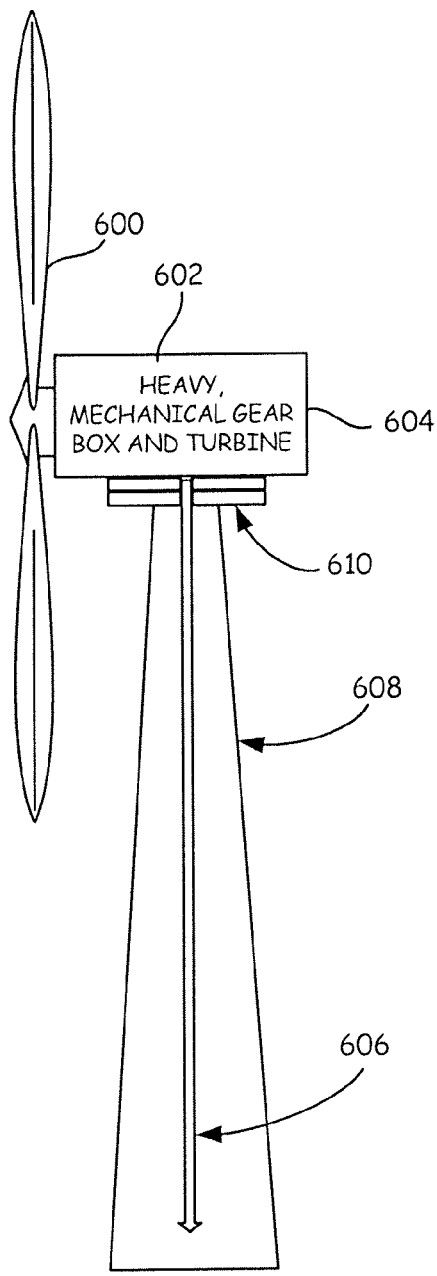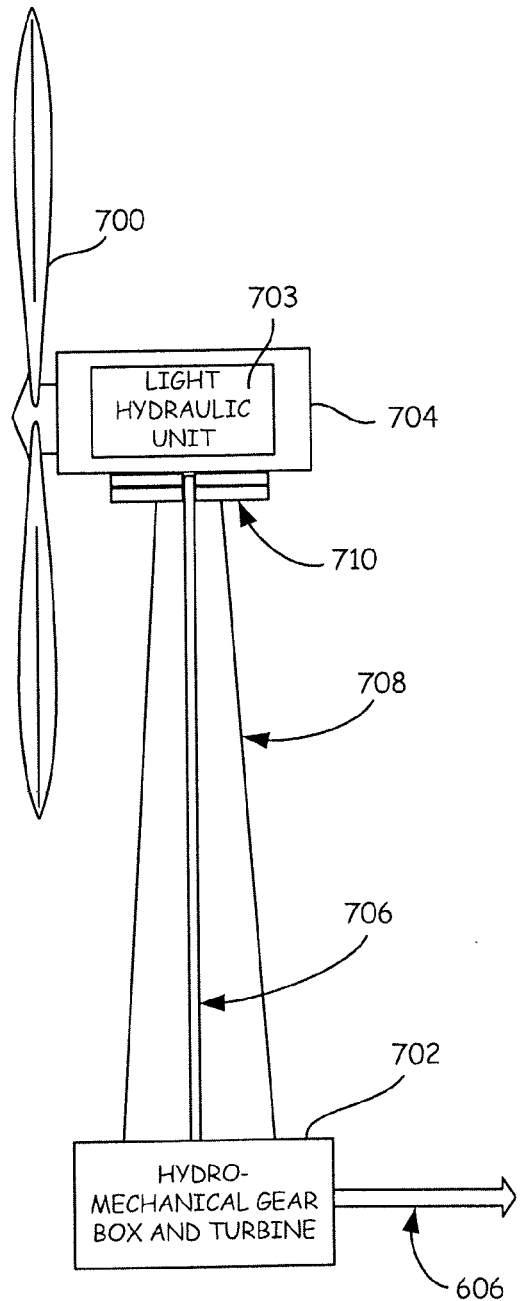
FIG. 3
(PRIOR ART)
FIG. 4

FLEXIBLE – STICK – SLIPFREE
AZIMUTH BEARING RING

SECTION B-B

US 9,309,924 B2

SEGMENTED COMPOSITE BEARINGS AND WIND GENERATOR UTILIZING HYDRAULIC PUMP/MOTOR COMBINATION

TECHNICAL FIELD

The present disclosure is generally directed to bearing technologies. More particularly, the disclosure relates to segmented bearings of composite materials and manufacturing processes and applications including, but not limited to, wind generators and other heavy equipment. A variety of ring bearings may be manufactured utilizing aspects of the present invention. The disclosure also relates to an alternative to the mechanical wind generator including utilization of a hydraulic pump/motor combination.

BACKGROUND OF THE INVENTION

Large diameter bearings suitable, for example, azimuth bearings for supporting rotating equipment such as wind power generators are typically formed from unitary components, such as bearing races.

Prior art azimuth bearings for wind generators typically undergo nonuniform loading. During the occasional movement in response to changes of wind direction, high impulse-type loadings are applied to the azimuth bearings. Such impulse loadings often result in excess contact zone stresses leading to surface damage and eventual bearing failure.

Prior art wind power generators typically include a gear box and electrical generator within the rotor housing supported upon the tower base. The gear box and electrical generator are relatively heavy and require routine maintenance. Access to the housing is limited by the height of the tower base. A need remains for a light-weight, less-complex approach to wind power generation.

SUMMARY OF THE INVENTION

The invention generally relates to processes and products of processes for making segmented composite-material bearings. Embodiments of the present invention may be used for various purposes, though exceptional advantages can be attained when used for large diameter bearings, such as azimuth bearings for supporting rotating parts of equipment such as wind towers for power generation. Therefore the invention will be discussed in connection with such uses.

Embodiments of the present invention concern bearings for the transmission of high axial forces and large flexural moments with small relative movements between the co-operating bearing components. Wind power installations would benefit with such a bearing between its pylon-supported machine head and the pylon head.

Bearings of the present invention involving the demand profile as specified above can be used for example as pivot bearings in cranes, certain leisure and pleasure installations and indeed wind power installations (as so-called azimuth bearings). In that respect, a structural problem arises out of the fact that, even in the case of a vertical rotary axis, the forces, both in the direction of an applied load and also in the lifting-off direction, have to be carried by the bearing.

Also included in this disclosure is a novel hydraulic fluid-based wind generator and system of wind generators utilizing hydraulic pump/motor combinations. In one embodiment, a one-to-one ratio exists between the hydraulic pump/motor combinations. In another embodiment, a single hydraulic motor can be supplied pressurized hydraulic fluid from a plurality of hydraulic pumps associate with a plurality of wind rotors.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

FIG. 3 is a depiction of an embodiment of a prior art wind generator.

FIG. 4 is a depiction of an embodiment of a hydraulic power-based wind generator.

DETAILED DESCRIPTION OF THE INVENTION

The invention relates to products and processes for making segmented composite-material bearings. Embodiments of the present invention may be used for various purposes, though exceptional advantages can be attained when used for large diameter bearings, such as azimuth bearings for supporting rotating parts of equipment such as wind towers for power generation. Therefore the invention will be discussed in connection with such uses.

Generally, a wind turbine includes a rotor having multiple blades. The rotor is mounted to a housing or nacelle, which is positioned on top of a truss or tubular tower. Utility grade wind turbines (i.e., wind turbines designed to provide electrical power to a utility grid) can have large rotors (e.g., 30 or more meters in diameter). Blades on these rotors transform wind energy into a rotational torque or force that drives one or more generators that may be rotationally coupled to the rotor through a gearbox. The gearbox steps up the inherently low rotational speed of the turbine rotor for the generator to efficiently convert mechanical energy to electrical energy, which is fed into a utility grid.

Figure 1:
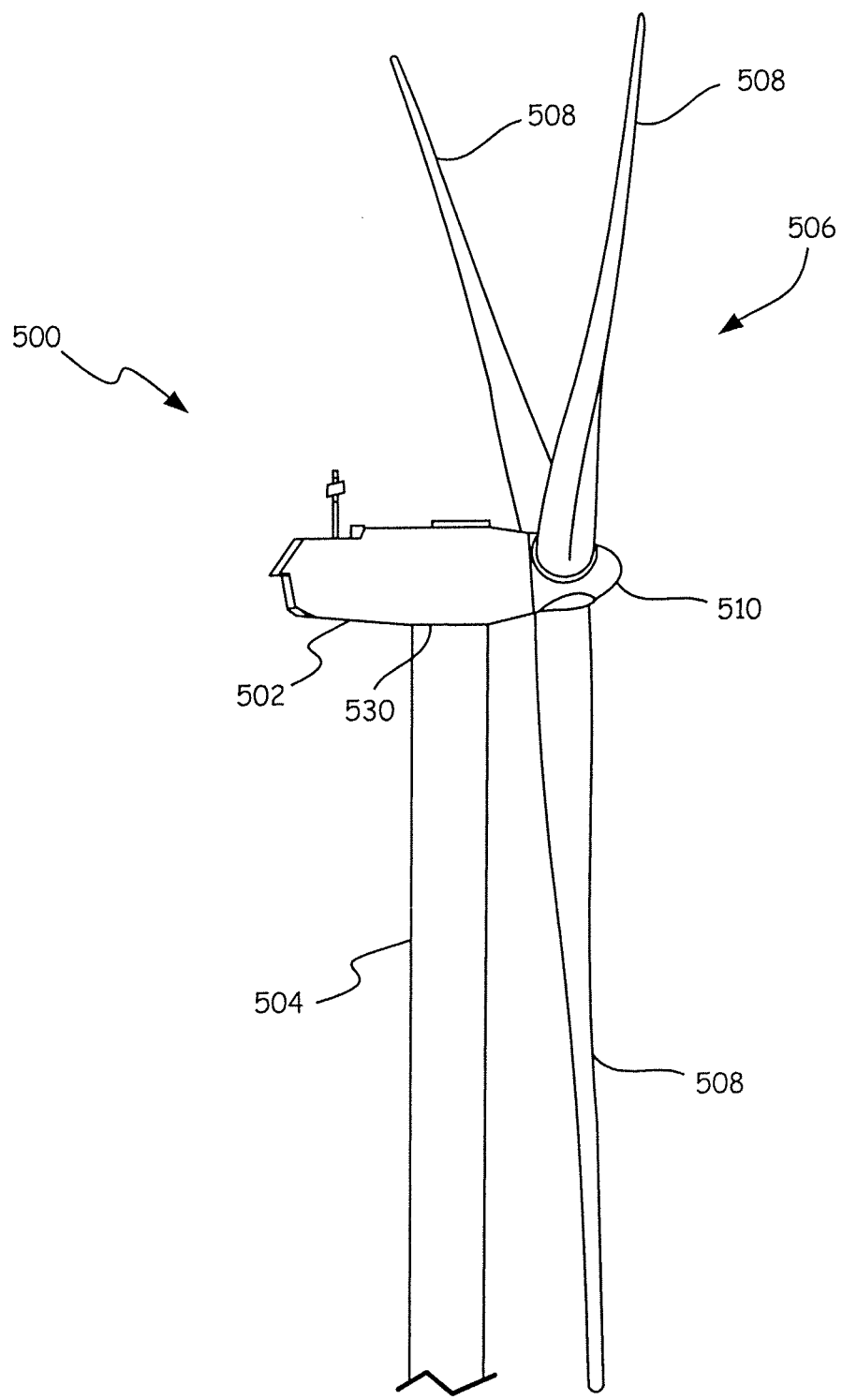
FIG. 1 is a side view of a wind generator within which a ring bearing assembly of the present invention is utilized.
Figure 2:
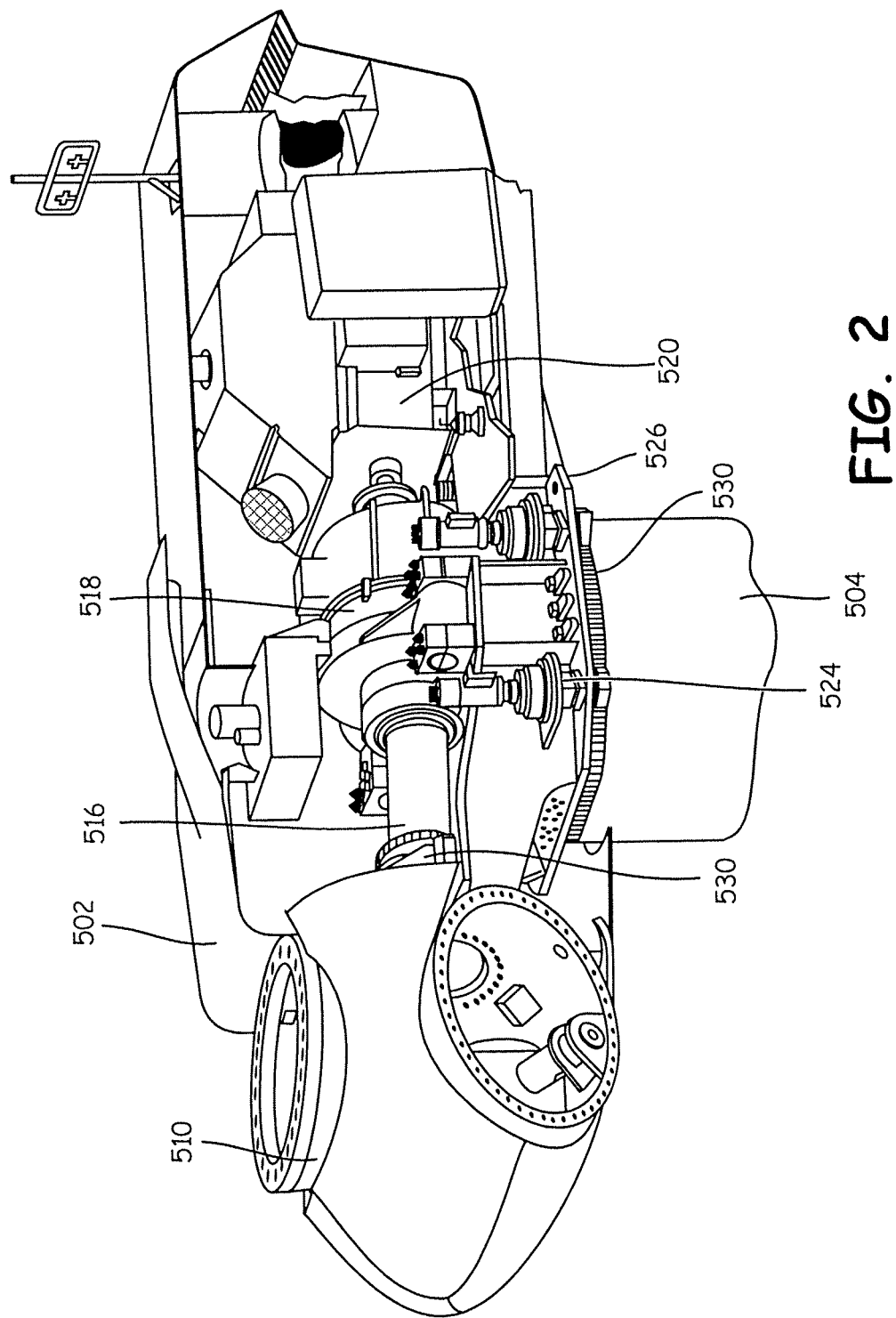
FIG. 2 is a cut-away detailed portion of the wind generator of FIG. 1.

In some configurations and referring to FIGS. 1 and 2, a wind turbine 500 comprises a nacelle 502 housing a generator. Nacelle 502 is mounted atop a tall tower 504, only a portion of which is shown in FIG. 1. Wind turbine 500 also comprises a rotor 506 that includes one or more rotor blades 508 attached to a rotating hub 510. Although wind turbine 500 illustrated in FIG. 1 includes three rotor blades 508, there are no specific limits on the number of rotor blades 508 required by the present invention. The drive train of the wind turbine includes a main rotor shaft 516 (also referred to as a "low speed shaft") connected to hub 510 via main bearing 530 and (in some configurations), at an opposite end of shaft 516 to a gear box 518. Gear box 518 drives a high speed shaft of generator 520. In other configurations, main rotor shaft 516 is coupled directly to generator 520. Yaw drive 524 and yaw deck 526 provide a yaw orientation system for wind turbine 500. A large azimuth bearing 530 is positioned between yaw deck 526 and tower 504. Yaw bearing 530 orients the nacelle toward the direction of the wind. Yaw bearing 530 mainly executes adjusting movements. Extreme load cases are defined to occur rarely during the service life of the bearing.

The efficiency of a wind turbine depends on many parameters including the orientation of the nacelle, or more specifically the location of the rotor plane with respect to the direction of the air stream. This is typically controlled by the yaw drive or azimuth-drive, which orients the nacelle into the wind. In modern wind turbines electrical and mechanical components form a yaw drive. More specifically, an electric high-speed drive motor is coupled by a gear reducer having a drive pinion gear engaging a bull gear. Usually the electric drive motor, the gear reducer, and the drive pinion gear are mounted on the nacelle's bedplate while the bull gear is fixed to the tower.

It will thus be observed that configurations of the present invention provide wind turbines with azimuth bearings that are cost effectively manufactured. Moreover, some configurations of the present invention will also be observed to provide other advantages, such as light weight construction and efficient interchangeability during repair or replacement.

Besides the rotational energy delivered to the generator and converted to electrical energy, other loads and forces act of the system. For example, substantial loads are transmitted over the tower head and the foundation.

FIG. 3 depicts a wind generator assembly providing a mechanical transformation between wind energy and electrical energy via the rotor 600, gear box and generator 602. In a typical application the gear box and generator 602 are located within the rotor housing 604. Electrical energy 606 is transmitted from the rotor housing via electrical conductors. The gear box and generator 602 and housing 604 are supported upon tower 608 via azimuth bearing 610.

In comparison to the above-described mechanical approach of converting inherently low rotational speed of the wind turbine rotor, a hydraulic fluid transformation offers another, very flexible and may be even more appropriate approach. FIG. 4 illustrates an alternative equivalent hydraulic approach where a hydro-mechanical gear box and generator 702 are positioned away from the rotor housing 704. A hydraulic motor/pump combination is utilized wherein a hydraulic pump 703 is located in the rotor housing 704 and the motor and generator 702 are located away from the rotor housing 704, such as at the tower base or even more remotely spaced from the rotor housing. Azimuth bearing 710 supports the housing 704 upon tower 708. The wind-driven rotor 700 drives the pump 703 to deliver pressurized hydraulic fluid 706 to the generator 702. Hydraulic fluid lines 706 provide fluid communication between the pump 703 and the generator 702. One significant benefit of such an approach is the reduction in weight carried by the rotor housing 704 and tower 708 as the motor/electrical generator may be ground supported. The reduction in weight achieve by the hydro-mechanical approach may allow for lighter and less expensive wind generators.

Figure 5:
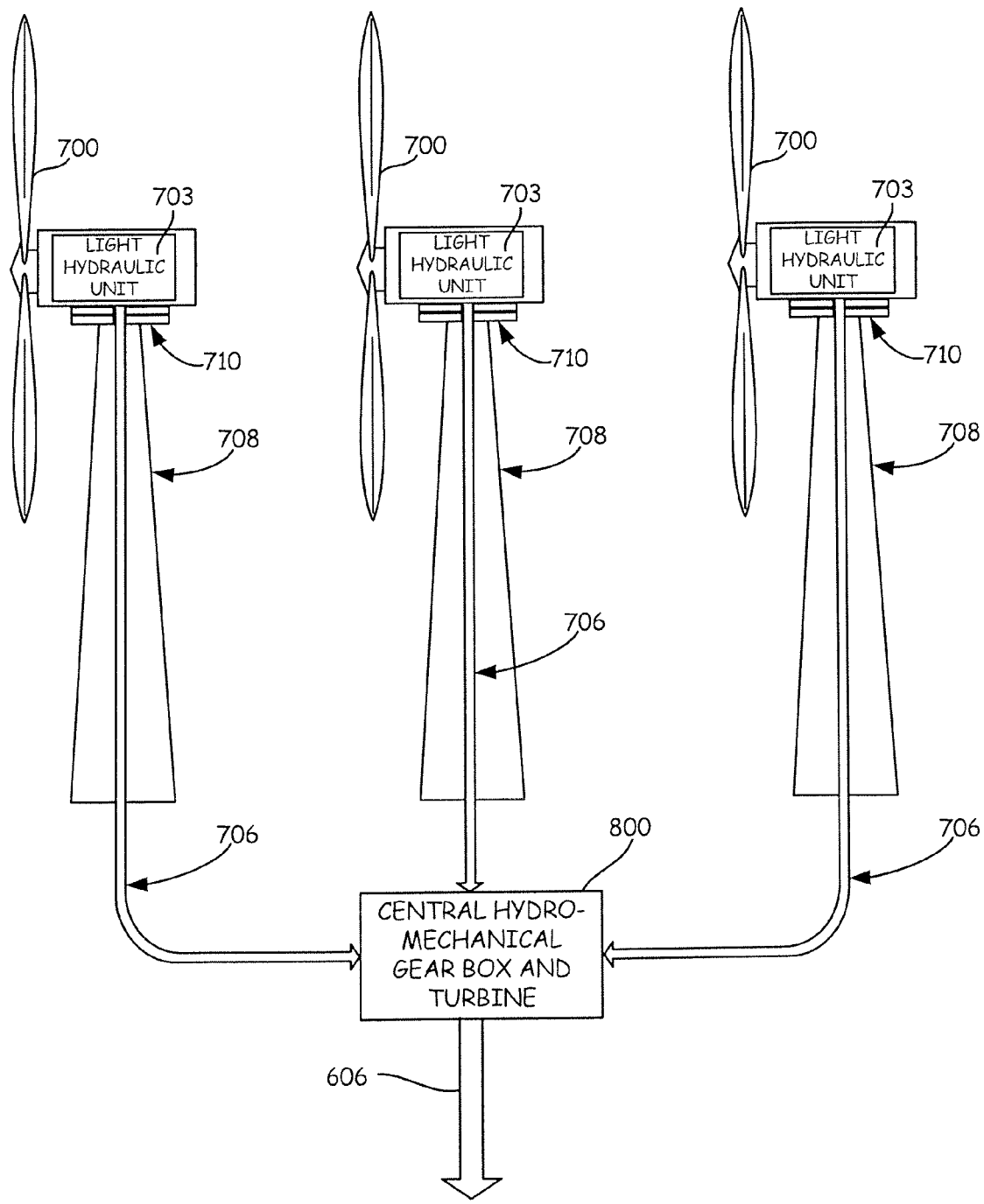
FIG. 5 is a depiction of an embodiment of a system of wind generators of FIG. 4.

In the embodiment of FIG. 4, a one-to-one relationship exists between the pump and motor. In another approach, such as shown in FIG. 5, a cluster of hydraulic turbine towers 708 feed hydraulic energy to a central hydraulic transformation unit 800. In this regard, one hydro-mechanical electrical generator can be utilized with several wind towers. Cost savings realized via such an approach may be significant.

For both versions, the mechanical and the hydraulic-based, there may still be a significant weight on located atop the wind turbine tower which may dictate the use of azimuth bearings in general. Bearings of such as described in this application are designed to optimize the performance, durability and long term benefit of this wind power technology.

Referring now to FIGS. 6-14, embodiments of bearing assemblies in accordance with the invention will be described. As will be appreciated based on this disclosure, advantages of segmented bearings in accordance with the present invention include: the provision of a sliding member having a low coefficient of friction bearing surfaces through the use of PTFE or related polymer materials, incorporation of a rigid body for supporting the sliding member of PTFE or related polymer materials, and an ability of the bearing to self-adjust in response to load conditions and/or bearing support conditions yielded from the bearing's flexibility, at the same time increasing the overall tower or system flexibility and ability to adjust to the given conditions instead of withstanding those given conditions.

Figure 6:
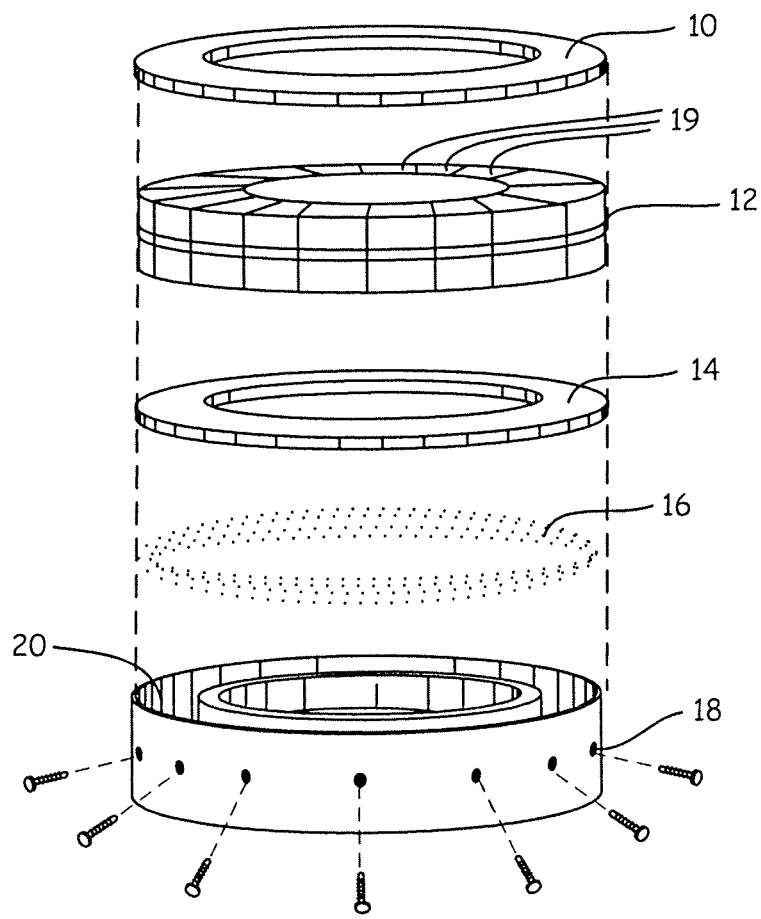
FIG. 6 is an exploded-view depiction of a bearing assembly according to an embodiment of the present invention.

FIG. 6 illustrates an exploded perspective view of a segmented bearing ring 8 including top ring 10, a plurality of bearing segments 12, bottom ring 14 and bearing support 16, comprised such as a plurality of ball bearings, resilient rubber-like material or fluid-filled supports. Housing ring 18 includes a circular channel 20 into which bearing components are received. An external or internal surface of housing ring 18 may be machined to define gears.

Bearing segments 12 include one or more sliding members 19 for supporting a bearing load in a sliding manner. As described in more detail hereinafter, bearing segments 12 include a relatively-rigid bearing support and a sliding member 19 of a low coefficient of friction material. Bearing segments 12 are held within housing ring 18 via a plurality of fasteners 22.

Figure 7:
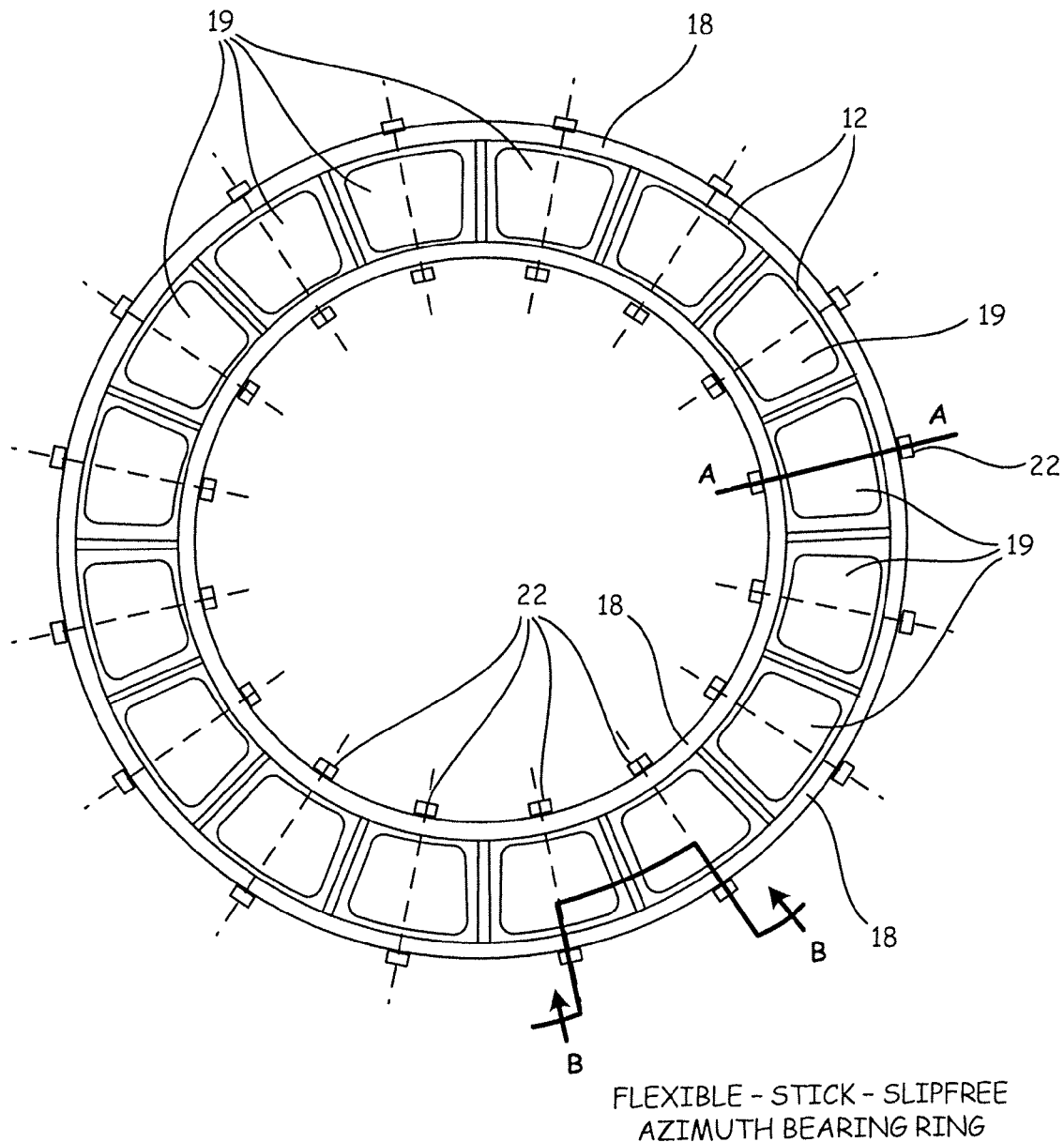
FIG. 7 is a top view of the bearing assembly of FIG. 6.

FIG. 7 is a top plan view of the bearing ring 8 of FIG. 6 further illustrating the plurality of fasteners 22 for securing bearing segments 12 to bearing housing ring 18. Fasteners 22 may be threaded fasteners or include other mechanical structures.

Figure 8:
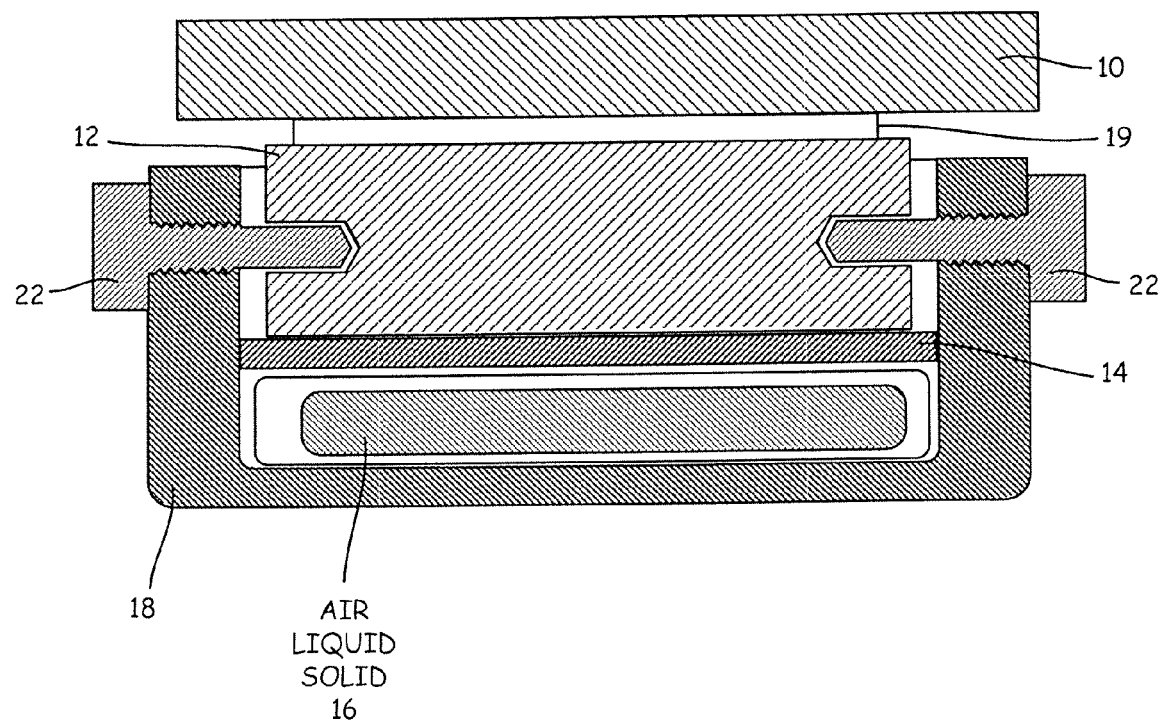
FIG. 8 is a cross-sectional view of the bearing assembly of FIG. 6

FIG. 8 is a cross-sectional view of the bearing ring 8 of FIG. 7 taken along lines A-A. Bearing support 16 may include a rubber-like pad containing fluid or liquid and/or solid bearing materials, such as ball bearings, depending on the desired load applications. Bearing support 16 may include an elastomeric bearing pad to more readily adapt to movement of the load carrying members, whether as a result of temperature change or as a result of varying wind loads. Further, complexity of movement of the load carrying members with respect to the wind generator support may be of limited consequence as the bearing support 16 is desirably free to lean and tilt and to move, thereby to adapt to complex movements without difficulty. In one embodiment of the present invention, bearing support 16 comprises an elastomeric main body portion of rubber or of a synthetic rubber, such as chloroprene, urethane rubber or the like.

Figure 9:
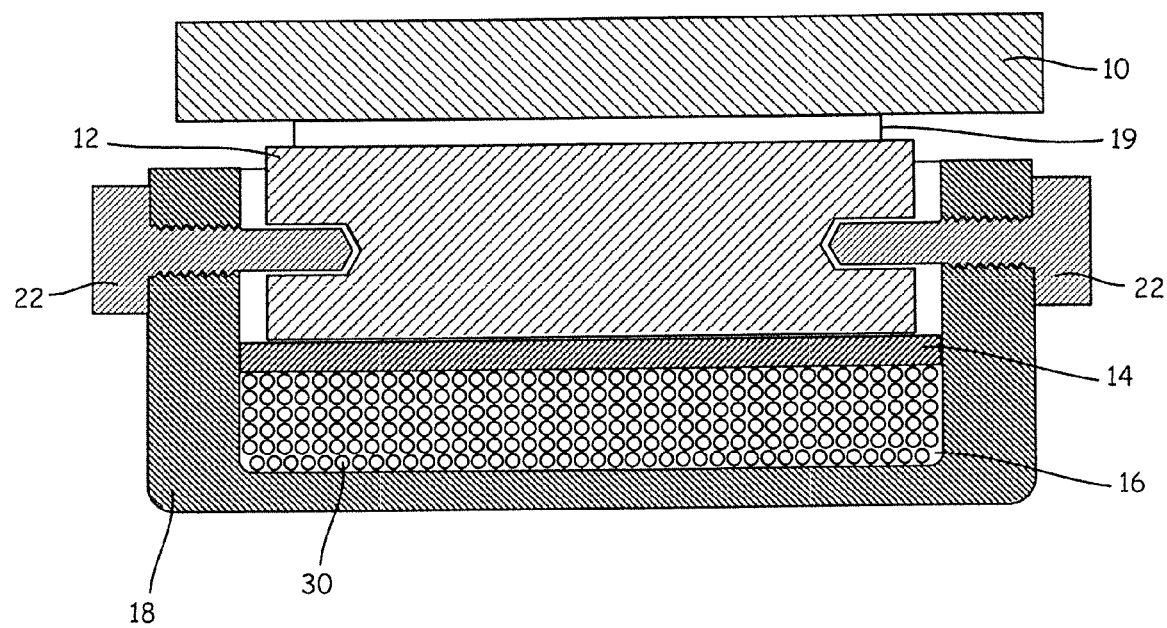
FIG. 9 is a cross-sectional view of another embodiment of the bearing assembly of FIG. 6.

FIG. 9 is a cross-sectional view of bearing ring 8 showing an alternative embodiment of bearing support 16 including a plurality of ball bearings 30. The sizing and quantity of ball bearings 30 would be dependent on the desired load applications. One benefit of the ball-bearing, air, liquid or solid elastomer based support 16 is the ability of the bearing 8 to self-adjust as load and/or support conditions vary. Bearing support 16 may be functionally similar to the bearing block technology disclosed in PCT Int. App. PCT/EP93/03028, published as WO 94/10468 to J. Corts.

Figure 10:
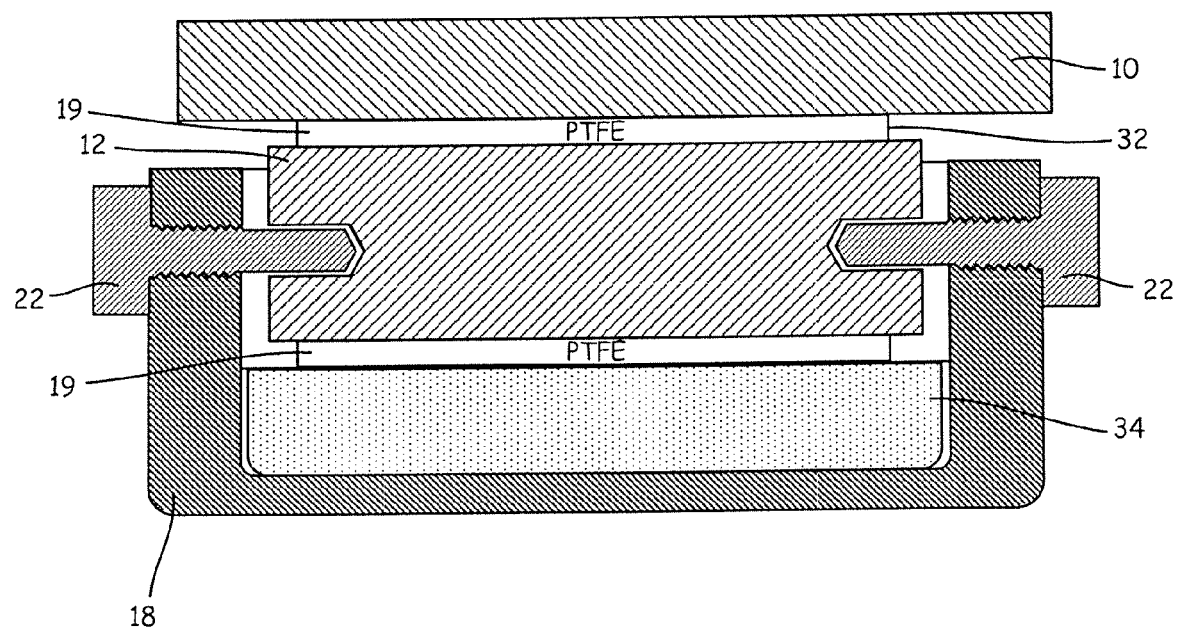
FIG. 10 is a cross-sectional view of another embodiment of the bearing assembly of FIG. 6.

FIG. 10 is a cross-sectional view of bearing ring 8 showing an alternative embodiment of bearing segment 12. In this embodiment, bearing segment 12 is provided with upper and lower sliding bearing surfaces 32, 34. In a similar embodiment of the present invention, bearing support 16 is not present and the bearing segment having a pair of bearing surfaces 32, 34 directly engages other bearing surfaces in a sliding manner.

Figure 11:
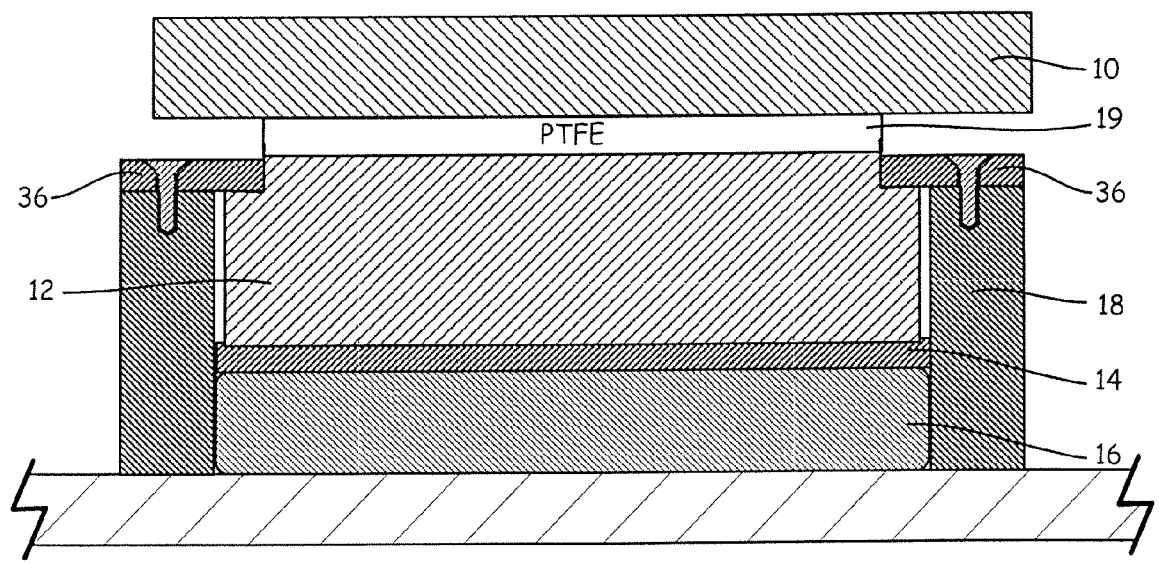
FIG. 11 is a cross-sectional view of another embodiment of the bearing assembly of FIG. 6.

FIG. 11 is another cross-sectional view of bearing ring 8 wherein bearing housing ring 18 is open-ended. Additionally, bearing segments 12 are retained within housing ring 18 by one or more hold-down rings 36.

Figure 12:
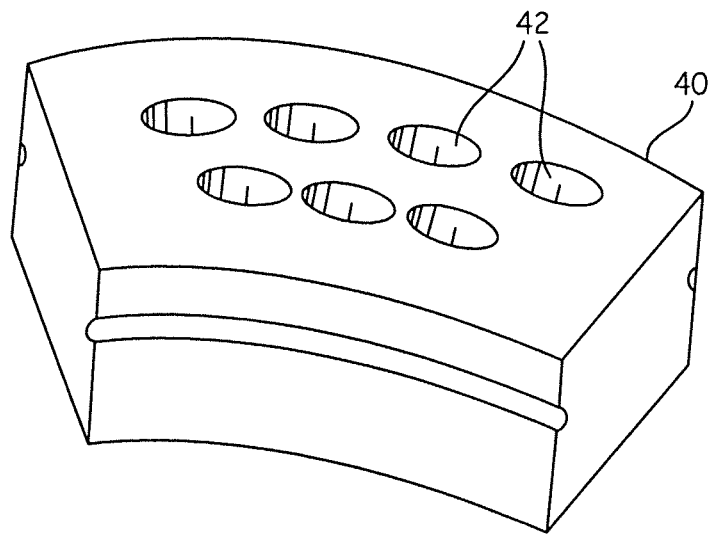
FIG. 12 is a perspective view of a bearing body segment of FIG. 6.
Figure 13:
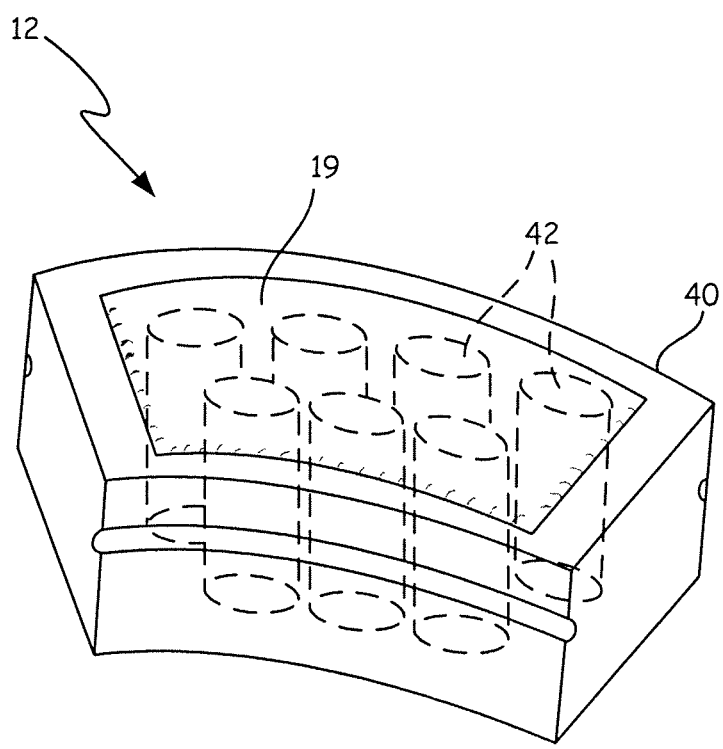
FIG. 13 is a perspective view of a bearing body segment of FIG. 12 including a sliding member.

FIG. 12 is a perspective view of bearing segment 12 showing body 40. FIG. 13 is a perspective view of a bearing segment 12 showing low friction sliding member 19 and support body 40. Support body 40 is preferably of metal construction, such as of a bronze or other material, and includes a plurality of holes or apertures. Support body 40 may be made of a variety of different relatively rigid materials, including but not limited to metals and non-metals. Support body 40 is adapted to define a fail-safe mechanism in the event sliding member 19 is destroyed or damaged during use.

Therefore, bearing segments 12 each include bearing body 40 and sliding member 19 defining a sliding bearing surface. Bearing body 40 preferably comprises metal material having given strength, the properties of which is not restricted essentially. One important aspect of the present invention is that bearing body 40 provides a fail-safe structure in the event of loss or destruction of sliding member 19.

Figure 14:
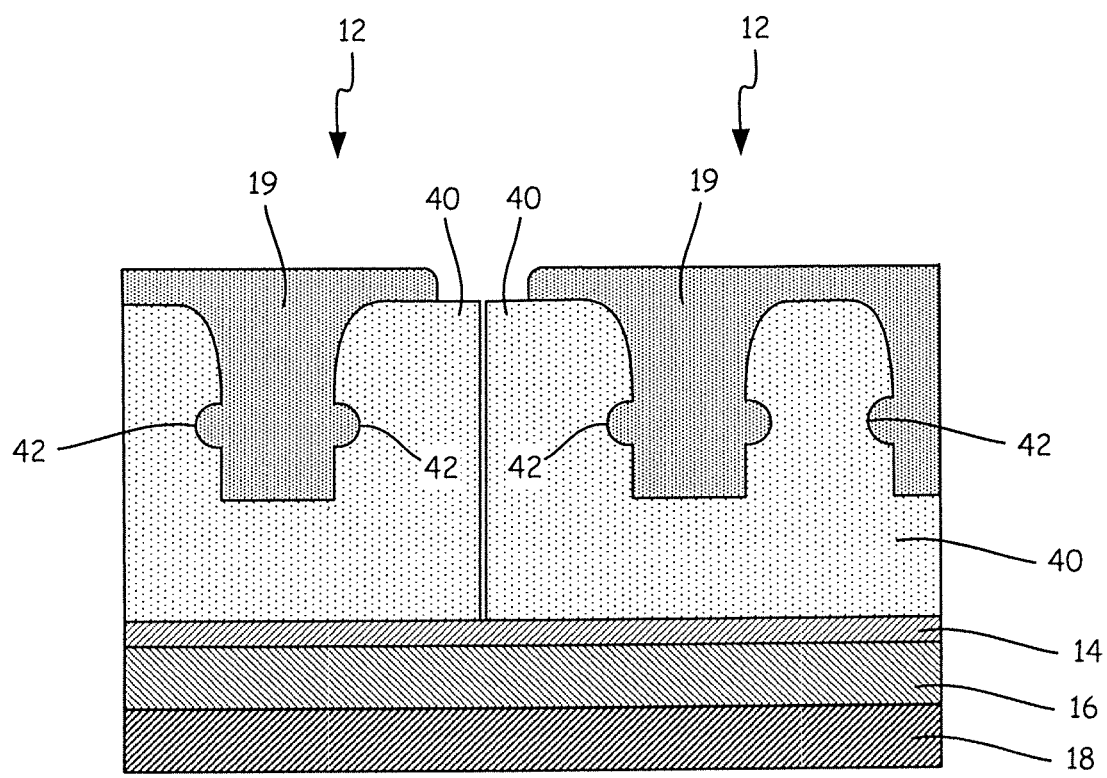
FIG. 14 is a cross-sectional view of the bearing of FIG. 7 taken along lines B-B.

FIG. 14 is a cross-sectional view of bearing ring 8 taken across lines B-B in FIG. 7. Due to the fact that certain PTFE-based materials have an extremely low coefficient of friction it is difficult to fix such materials to an underlying bearing support body 40. Addressing this limitation, bearing segments 12 each include a support body 40 having retention structure 42 to assist in securing the sliding member 19 to support body 40. Retention structure 42 provides a mechanical lock to prevent the sliding member 19 from separating from support body 40 during use. A variety of different retention structure surfaces would be practicable in alternative embodiments of the present invention.

Various embodiments of the present invention describe a mechanical connection between PTFE-based sliding member 19 and support body 40. The prior art includes German patent no. 9315675.8, originally assigned to MACOR Marine Systems, Bremen, Germany, and incorporated by reference herein. Additional teachings of PTFE-based bearings are found in PCT International Application WO/98/35873, to J. Corts, and incorporated herein for all purposes.

Sliding member 19 preferably comprises a material with self-lubricity and the material composing the sliding member 19 may be a self-lubricity organic material or inorganic material or the combined material with self-lubricity. Hereinafter, the "self-lubricity material" or "material with self-lubricity" shall have low friction coefficient. The reason of using "self-lubricity material" for a material of the sliding member 19 is based on the fact that the bearing body 40 is positioned on a plate or pad fixed on a base, should be smoothly sliding on the plate or pad during operation of the associated equipment, e.g., the wind turbine.

The self-lubricity material is applied to one or more sides of the bearing body 40 facing and contacting to pad/plate bearing surfaces so as to form a smooth sliding between the bearing 8 and the support pad/plate. Further, by applying such self-lubricity material, the necessity of inserting a lubricant between can be removed so as to reduce much the cost of maintenance.

The self-lubricity material to be applied has preferably less than 0.30 of the friction coefficient between the sliding member 19 and the bearing support surfaces. This will enable smooth sliding between the bearing surfaces, even in the view of changes of the alignment due to a variety of sources. The friction coefficient may be more preferably less than 0.20.

An organic material with self-lubricity may be a resin material with self-lubricity. There may be listed for resin material with self-lubricity to be applied on the sliding member 19 for example, PTFE, ethylene tetrafluoride, ethylene tetrafluoride perfluoro alkoxy ethylene, polyether ether ketone and polyimido having low friction coefficient. Those materials can be used solely or in the combination. Suitable materials for sliding member 19 may also include high density polyethylene (HDPE) or ultra high molecular weight polyethylene (UHMWPE). Other suitable sliding member 19 materials may comprise filled compositions, such as those incorporating graphite or reinforcing agents, such as glass fibers, and fabrics, such as woven or non-woven fabrics. For example, sliding member 19 may include fiber-based plain bearings utilizing fiber reinforcement technology as disclosed in Pat. No. DE 4439887, filed Nov. 8, 1994, said document being incorporated herein by reference. As a result, the self-lubricity material forming the sliding member 19 may be sole material with the self-lubricity, or the self-lubricity material reinforced with reinforcing material (composite). The reinforcing material may be glass fibers, carbon fibers, graphite fibers or ceramic fibers or the particulate material thereof. The content of the reinforcing material can be changed depending on bearing load requirements.

In one embodiment of the present invention, sliding member 19 is formed of a fluorine-based resin such as polytetrafluoroethylene (PTFE), and PTFE may be used solely or as a mixture with glass fibers or molybdenum disulfide. It is also possible to form a laminated structure which comprises a layer of PTFE only and a layer of PTFE mixed with glass fibers or molybdenum disulfide. When the sliding member 19 is disposed on the side of the bearing body 40, PTFE can be charged into the holes or openings with ease, and the sliding surface is good in abrasion resistance due to the low coefficient of friction and a good sliding property of PTFE.

In the sliding member 19 described above, the fluorine-based resin layer made of PTFE or a mixture of PTFE and glass fibers or molybdenum disulfide can be bonded uniformly to the bearing body 40 with a high strength. Therefore, reliability of the sliding member 19 and of various devices using it can be enhanced remarkably.

The compression elasticity modulus (E) of the material with self-lubricity is preferably more than 500 MPa. By using the material having the compression elasticity modulus (E) more than 500 MPa, the deformation due to the weight of the wind turbine components can be controlled and further, the shifts in the alignment can be accommodated.

As described above, the bearing body 40 and the sliding member 19 can be joined by means of mechanical binding. Compression molding or injection molding of the self-lubricity material on the surface of the bearing body 40 can be used to mechanically and thermally couple the sliding member 19 to the bearing body 40. Those technologies can be selected depending on the properties of the self-lubricity material to be formed.

As described above, a portion of a sliding material 19 is inlaid in the bearing body 40 to make the bearing segment 12 by applying a combination of heat and pressure to self-lubricity material to form the sliding surfaces of the self-lubricity material on the bearing body 40. Retention structure 42 are preferably formed on surfaces of the bearing body 40 so that they are filled with a portion of the self-lubricity material to form the sliding member 19 of the self-lubricity material and provide further the wedge effect by the filled self-lubricity material to control or reduce the dislocation and release between the bearing body 40 and the sliding member 19.

In one embodiment, openings formed in the bearing body 40 are filled with self-lubricity material. The openings are filled and cured with material with self-lubricity so as to form the sliding surface of the self-lubricity material thereon. As described above, the sliding member 19 can be prevented from release and dislocation by the wedges as formed by the retention structure 42 to securely fix the sliding member 19 to the bearing body 40. In one bearing embodiment, such as described above, the bearing body 40 has large porosity (holes, apertures, channels, slots, etc.) and is a relatively complex structure in the form of three-dimensional network. When the sliding material is charged or thermally formed into the porous bearing body 40, the contact area between the bearing body 40 and sliding member 19 can be determined large, and a good wedge effect can be obtained. In other words, since the porous bearing body 40 and sliding member 19 coupled therein are mutually engaged in a complex form against a tensile direction, a high wedge effect is exerted to enhance a bonded state, and the contact area can be increased substantially to improve connection properties between, for example, PTFE and a metal bearing body.

Segmented annular bearings of the present invention are well suited for the transmission of high axial forces and large flexural moments with small relative movements between the co-operating bearing components. A wind power installation may include such a bearing between its pylon-supported machine head and the pylon head. Bearings of the present invention involving the demand profile as specified above can be used for example as pivot bearings in cranes or other large equipment, such as rotating machines at amusement facilities etc.

There is noted that the above mentioned embodiment of the present invention is illustrated in case of a segmented bearing using a self-lubricity material, but the other self-lubricity material can be applied to the structure of the bearing body 40 in use for wind generators, and the selection and choice of the material and the structure of the bearing body 40 can be appropriately done from variety of the materials.

Figure 15:
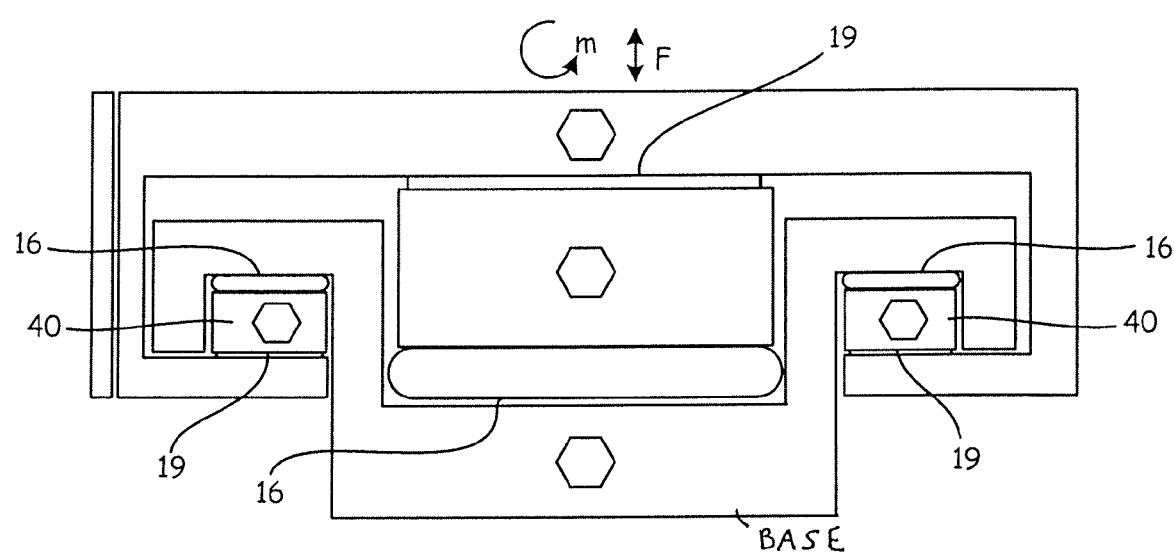
FIG. 15 is a cross sectional view of a bearing embodiment including a self-locking feature.

The rotary bearing which is generally referred to as an azimuth bearing makes it possible—by means of the tracking drive—to adjust the rotor which receives the wind power, in such a way that, depending on the respective wind direction, the highest level of efficiency is achieved and in addition, when the installation is stopped, the loading on all components of the installation is kept as low as possible. Usually, the rotary bearing which must be of large diameter in high-output wind power installations comprises a rotary ball-type connection. A bearing according to the invention is substantially better suited to carrying high forces when small movements are involved. The bearings in accordance with the present invention can carry vertical forces which occur in the axial direction both in the direction of an applied load and also in the lifting-off direction. FIG. 15 discloses one embodiment of a self-locking version of a bearing assembly incorporating aspects of the present invention in which the bearing assembly is secured against uplift. In such an example, multiple sliding members are provided, including a center sliding member and two or more external sliding members.

Although the present invention and its advantages have been described in detail, it should be understood that various changes, substitutions and alterations can be made herein without departing from the spirit and scope of the invention. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention.

The invention claimed is:

1. A segmented ring bearing comprising:
   a plurality of bearing segments with each bearing segment comprising a non-metallic sliding member and a metal bearing body;
   an annular ring supporting the plurality of bearing segments;
   a ring housing carrying the annular ring and plurality of bearing segments; and
   a bearing support positioned between the annular ring and a surface of the ring housing, said bearing support having flexibility to accommodate changes in alignment of the plurality of bearing segments during use.

2. The segmented ring bearing of claim 1, wherein at least some of the plurality of bearing segments include a retention structure adapted to receive a portion of the non-metallic sliding member.

3. The segmented ring bearing of claim 2, wherein the non-metallic sliding member is positioned on at least two sides of the metal bearing body.

4. The segmented ring bearing of claim 3, wherein the retention structure is defined within an aperture formed between the at least two sides of the metal bearing body.

5. The segmented ring bearing of claim 1, wherein each of the plurality of bearing segments is a segment of a circle.

6. The segmented ring bearing of claim 1, wherein the bearing support is contained within the ring housing between a lower surface of the ring housing and a pair of curved walls of the ring housing.

7. The segmented ring bearing of claim 1, wherein the bearing support includes one or more of: a resilient material, a fluid, and a plurality of ball bearings.

8. The segmented ring bearing of claim 1, wherein the non-metallic sliding member is a PTFE-based material.

9. The segmented ring bearing of claim 1, wherein the non-metallic sliding member is a self-lubricating, low coefficient of friction polymer.

10. The segmented ring bearing of claim 1, wherein the ring housing is adapted to be connected to a base of a wind turbine, with the segmented ring bearing supporting at least a rotating component of the wind turbine.

11. A segmented ring bearing comprising:
a plurality of bearing segments with each of said plurality of bearing segments comprising a bearing body and a non-metallic sliding member;
a top annular ring positioned to engage the plurality of sliding members;
a bearing housing for mechanically coupling the plurality of bearing segments into the shape of a ring, wherein at least some of the plurality of bearing segments include a retention structure, said retention structure including an undercut cavity into which at least a portion of the non-metallic sliding member is secured.

12. The segmented ring bearing of claim 11, wherein the non-metallic sliding member is positioned on at least two sides of the bearing body.

13. The segmented ring bearing of claim 11, wherein each of the plurality of bearing segments is a segment of a circle.

14. The segmented ring bearing of claim 11, further comprising a bottom annular ring supporting the plurality of bearing segments.

15. The segmented ring bearing of claim 14, further comprising a flexible bearing support positioned between the bottom annular ring and the bearing housing.

16. The segmented ring bearing of claim 15, wherein the bearing support is contained within the bearing housing between a lower surface of the bearing housing and a pair of curved walls of the bearing housing.

17. The segmented ring bearing of claim 15, wherein the bearing support includes one or more of: a resilient material, a fluid, and a plurality of ball bearings.

18. The segmented ring bearing of claim 11, wherein the non-metallic sliding member is a PTFE-based material.

19. The segmented ring bearing of claim 11, wherein the non-metallic sliding member is a self-lubricating, low coefficient of friction polymer.

20. The segmented ring bearing of claim 11, wherein the bearing housing is adapted to be connected to a base of a wind turbine, with the segmented ring bearing supporting at least a rotating component of the wind turbine.

* * * * *